United States Patent Office 3,390,681
Patented July 2, 1968

3,390,681
POLYESTER SUTURE HAVING IMPROVED KNOTTING CHARACTERISTICS
Leonard D. Kurtz, Woodmere, N.Y., assignor to Sutures Inc., Coventry, Conn.
No Drawing. Continuation-in-part of application Ser. No. 220,085, Aug. 28, 1962. This application Apr. 4, 1966, Ser. No. 539,637
8 Claims. (Cl. 128—335.5)

ABSTRACT OF THE DISCLOSURE

A surgical suture having improved knotting characteristics. A multifilament thread of polyester fibers, preferably polyethylene terephthalate, is combined with Teflon such that Teflon deposited in the interstices of the suture, reduces the tendency of the knot throw to open and Teflon deposited on the external surface of the suture enhances the ability of the suture to snug down.

---

This is a continuation-in-part of my co-pending application Ser. No. 220,085, filed Aug. 28, 1962.

This invention relates to surgical sutures. More particularly, the invention relates to polyfilamentous non-absorbable surgical sutures of improved knotting characteristics.

As used herein, the term "suture" includes surgical strands used to sew tissue as well as those used to tie off blood vessels and the like. Thus the term includes strands sometimes referred to as "ligatures."

Sutures are classified as either absorbable or non-absorbable and may be either polyfilamentous or monofilamentous. For the surgeon, the polyfilament sutures, which may be braided, woven, twisted or spun, have superior knotting characteristics relative to a monofilament suture of the same material and it is to this type of suture that the present invention relates.

There are several polyfilament sutures of the non-absorbable type in present use. Silk, for example, has been used for years. There are several synthetic fibers which have been proposed for use as sutures and, among them, polyester fibers have characteristics which render them particularly suitable for use as a surgical suturing material. These fibers are made from the linear condensation polymeric product produced by the reaction of a difunctional carboxylic acid and a diol. Chief among such polyester fibers are polyesters of the terephthalate type such as Dacron which is available as a suture. Dacron fibers are made from polyethylene terephthalate which is the reaction product of ethylene glycol and terephthalic acid. Polyesters from other diols and dicarboxylic acids may also be used such as, for example, polyesters from the reaction of ethylene glycol with both isophthalic and terephthalic acids. Other diols, such as cyclohexane dimethanol may also be used with the phthalic acids to produce fiber-forming polyesters from which non-absorbable polyester sutures can be fabricated. Polymeric linear polyester materials of the foregoing type are illustrative of the linear polyester fibers useful for making sutures which can be improved according to the present invention. Terephthalate type polyester fibers sold under the trademarks "Dacron," "Kodel" and "Terylene" are illustrative and are more fully described, for example, in U.S. Patents 2,465,319 and 2,901,446. Sutures fabricated from these fibers are made under rigorous conditions to ensure freedom from contaminants in amounts which would not be tolerable for use as a suture.

Dacron and several other polyester fibers have a lower reaction within the tissue than silk and have a higher tensile strength. The material is naturally water proof and therefore is non-capillary. All of these properties indicate that the polyester fiber could be fabricated into an excellent non-absorbable suture, but the knotting characteristics thereof are so poor relative to silk as to seriously prejudice the surgical use thereof. Knots in polyfilament polyester have a definite tendency to loosen considerably from the point at which the knot was formed. Furthermore, the second throw tightens on the first throw at its loosened point and does not "snug down" the first throw. Thus, no matter how many knots are used, the first throw is not snugged down and the last knot has a tendency to open.

Polyfilament Dacron polyester sutures, despite the foregoing disadvantages, are nevertheless used in certain situations and as many as nine throws are employed to give acceptable knot security. In general, this amounts to at least one additional throw than is required with silk, but the need for additional throws does not appear to be the main prejudice against the use of Dacron polyester sutures in surgery. The main prejudices seem to be the loosening of the first throw and the inability of a second throw to snug down the first throw when the loosening has occurred.

It is an object of the present invention to provide polyfilament polyester sutures of improved knotting characteristics.

These and other objects which will become apparent in light of the following detailed description which includes a preferred embodiment, are achieved according to the invention by providing a polyfilament polyester suture, such as a Dacron suture, with polytetrafluoroethylene in the manner described.

According to the present invention, the knottability of polyfilament polyester sutures is considerably improved by providing polytetrafluoroethylene on the surface and within the interstices thereof. It has been found that by thus providing a polyfilament polyester, for example Dacron, suture, with Teflon, the tendency of the first knot throw to open is remarkably reduced. Furthermore, a second knot throw is able to snug down the first knot throw and thus the invention overcomes the main prejudice against the surgical use of an otherwise highly desirable suture. Still further, the improvement in knottability is not achieved at any sacrifice in other properties of the suture. The coated suture is equally as inert as the uncoated suture.

EXAMPLE

A 4-0 Dacron suture was passed through a suspension of Teflon in water. The suture was of conventional size having a 4 thread core of denier 56 and a 12/2 thread cover having a denier of 336. Total denier was thus 392. The Teflon suspension was obtained by diluting a commercially available blend (Du Pont 2510) which contains 58% Teflon particles by weight in water. A tenfold dilution was employed. The particles are in the ½ micron size range and were suspended with the aid of a wetting agent (Triton X–100, Rohm and Haas). The suture so treated was then washed to remove any excess material and then dried. The treated suture was found to have increased in weight by less than one percent which represents the amount of Teflon incorporated on the surface and within the interstices of the suture. The treated suture was then hot stretched to reduce the elastic memory thereof. This was accomplished by stretching the suture approximately 40% based on its original length at a platen temperature of 450° F. on a hot stretching machine made by the W. M. Steele Company (Model 115). As a control, an identical Dacron suture, without being first impregnated with Teflon, was similarly stretched.

Knottability of the treated suture was compared with the untreated suture by tying knots of each on a polished steel cylinder of about ¾" diameter. The treated suture had noticeably less tendency to loosen. Both knots were then intentionally loosened to the same extent and a second knot throw was then added to each and was observed to snug down the knot of the treated suture but not of the untreated suture. The snugged down knots also tended to remain down and the second throw was not observed to loosen. A square knot was then provided in the treated suture well above the snugged down knot. A square knot similarly located on the untreated suture simply locked and the suture broke on being pulled tight.

The treated suture was also noticeably more flaccid than the untreated suture. This property is graphically demonstrated by coiling an equal length of each suture into a one inch coil and comparing the properties of the coil. The untreated coil is markedly more springy.

Other Dacron polyester sutures ranging in sizes from 0 to 6–0 were similarly treated and it was found that knottability of the thread was improved with the addition of up to 2 weight percent and above of Teflon based on the weight of the polyester. At higher levels the suture was soft, but was quite slippery on the surface. Accordingly, it is preferable to keep the amount of impregnation below 4% and even more preferable to keep the impregnation below 1% so that the improved knottability is not offset by a high degree of surface lubricity. The amount of impregnation can be easily controlled within any desired limits by varying the concentration of Teflon or the length of time of impregnation or both.

The Teflon particles should preferably be small and several commercially available blends having average particle sizes below 1 to 10 microns are available and suitable. The sutures can be simply immersed in the Teflon suspension or continuously drawn therethrough. Suitable stable dispersions, described in Berry, U.S. Patent No. 2,478,229, can be used. It is preferred to dilute these dispersions to keep the amount of impregnation low.

The Teflon particles are tenaciously held by the sutures and will not separate therefrom in an aqueous environment or under torture testing such as repeated washing or testing with high-velocity water streams. The impregnated suture has been found to be no more reactive than untreated sutures in thousands of clinical cases.

The improvement in knottability of the sutures impregnated with Teflon according to the invention is remarkable. With levels of Teflon as low as ½%, ¼% and even less by weight of Teflon, the improvement in knottability is noticeable and can be graphically demonstrated by comparing the properties of coils of the treated material with similarly sized coils of untreated material. The knotting characteristics of the treated suture approach those of the surgeon's norm (waxed silk) and yet all the advantages of the synthetic over silk are retained.

The improved knotting characteristics achieved by the present invention are perhaps explained by the following theoretical analysis of knotting.

One important factor in knotting is the relationship between the number of throws and the security of the knot. If a loop formed by a knot is sufficiently pulled, the knot will either open (disrupt) or break. All other factors being equal, knot security, or tendency not to open, will be in direct proportion to the number of throws until a point is reached where additional throws are ineffective. After that point is reached, continued pulling will simply break the knot. The knot has reached its maximum security. Each surgeon is aware of this relationship and each passes his own judgment. In the case of polyfilament polyester sutures, such as Dacron, surgeons use from three to nine throws for a complete knot depending on circumstances.

Another factor is surface lubrication which is related to the nature of the lubricant and the amount and distribution thereof on the surface in question. It is apparent that a siliconized silk suture is more slippery than a waxed silk suture and that a Teflon coated polyester suture is more slippery than a wax coated polyester suture. At the same time, heavier coats of any given lubricant will give higher degrees of lubrication than minimal coats thereof.

A further factor is the ability of the suture to tighten on itself. One of the striking characteristics of silk sutures is the ability of the knot to tighten on itself when the patient strains, coughs, sneezes or in any way pulls on the loop of the suture. If a waxed silk suture is knotted with three "throws," well laid, squared, and snugged and the "ears" left when the surgeon cuts his knot are 0.1 inch long, the majority of these knots will disrupt under increasing tension on the loop but the knot will not break. When exactly the same technique is used, and the "ears" are 0.3 inch or longer, a great majority of these knots will break and not disrupt. The only difference is the size of the "ears." This property is undoubtedly the manifestation of the property of the throws of the knot to lock against each other. It is considered that this property is related to lubrication of surfaces. When an unwaxed silk suture is used, the three-throw technique with 0.1 inch ears go to the knot-break. In fact, two throws with 0.1 inch ears go to the knot-break. The lack of lubricity on the surface permits locking of the throws against each other with no displacement. In the same way, polyester suture knots will go to knot-break with three throws and a 0.1 inch ear. When the surface is highly lubricated with Teflon, using the same technique exactly, practically all the knots will disrupt. In essence, the ability of a suture to snug itself is therefore related to the lubricity of its surface.

Another factor is stiffness of the suture. All throws are affected by this stiffness. The first knot throw tends to open, losing its line of apposition because the suture is sharply flexed at the throw. The suture has inherent energy which tends to straighten it. If this "hiking" upward does occur, it is necessary for the next throw to restore the knot to its original position. But the second throw is also affected by stiffness. It tends to open for exactly the same reason the first throw tended to open. The same process continues right through the making of the entire knot, be it the first throw or the ninth. All have the same tendency to open when unrestrained. It should be obvious that the tendency to open would be in direct proportion to the degree of stiffness, i.e., the greater the stiffness, the greater the tendency to open. It has been observed that polyester sutures, which are markedly stiff, have an appreciable tendency to open in such surgical procedures as suturing a heart valve. This surgical use involves continuous oscillation of the suture and as many as nine throws have been used in an attempt to delay or defeat the spontaneous opening of the suture knot. Other factors such as elasticity and construction of braid obviously affect knotting but are not directly relevant to the present invention.

In impregnating the Dacron with Teflon, an unusual result was observed, which can be explained in retrospect. The braided suture apparently became much softer than before the impregnation. It should be realized that the ability of the suture to change its contour without inherent strain is dependent upon the ability of the internal portions of that suture to rearrange themselves in such a way that the strain is minimized or absent. With monofilaments, there cannot be any rearrangement of the internal forces since all cross-sections are locked to all other cross-sections. In polyfilamentous materials, such as braided Dacron, it should be possible for the multiple filaments which make up the suture strand to rearrange themselves to relieve the stress. Most likely, the addition of Teflon into the braid itself expedites the fibrils sliding over each other and therefore decreases the amount of internal stress when the contour of the suture is changed. With the decrease in stiffness, the tendency of the first throw to "hike" upward is decreased. The ability to lock all throws together is increased. The tendency of the last throw to open spontaneously is decreased. In essence, the tendency of the knot to open spontaneously, almost disappears. The surgeon has a much easier time making the knots.

Finally, the surface of Dacron has too high a coefficient of friction. When the first throw "hikes" upward, with a square knot technique, the second throw locks into the first throw and is unable to restore the first throw to its original position. The surgeon has to start all over again. When Teflon lubricates the surface of the polyester and the first throw does "hike" up, it is easy to push the first throw back to the line of apposition with the second throw. With these two throws holding, it is easy for the surgeon to complete his knot. Finally, the relative surface lubrication is highly important in the process of self-snugging. It is found that varying the concentration of Teflon on the surface of polyester braid will give control of this process. The most widely used and satisfactory suture as far as knotting technique is concerned has been surgical silk. By providing Teflon on a polyester suture in accordance with the present invention, it is possible to closely simulate the silk technique with the polyester suture, which is a marked advance.

While the details of the invention have been described with reference to Dacron type polyester, polyfilament sutures of other polyester fibers which have similarly poor knotting characteristics can be similarly improved by impregnating such sutures in accordance with the present invention. For example, sutures of Kodel and other linear polyesters of the terephthalic acid type can be used.

The sutures provided by the invention can be sterilized by the manufacturer or the user by known techniques, for example by autoclave, ethylene oxide or electromagnetic radiation. The sutures can also be provided in sterile packages. The sutures may be provided in cut lengths of for example, 18 inches to 36 inches or on spools. The sutures can also be provided attached in known manner to surgical needles which may be eyed or eyeless.

The Dacron polyester fiber from which the suture is fabricated may be any of several commercially available such as Du Pont type 55 which was used to make the suture of Example I. Stretching of the suture is accomplished by techniques known per se in the art in connection with polyesters. The polyesters are conveniently stretched at platen temperatures up to just below temperatures at which the polyester sticks and the degree of stretch may be up to the breaking point and conveniently up to 50%. There is nothing unusual about this hot stretching step and techniques known to the applicable to polyester fibers generally are applicable to the present polyester sutures to reduce or eliminate the elastic memory of the fibers of which the suture is composed. However, the hot stretching step does reduce the size of the suture material and this is advantageous for surgical uses. The Teflon dispersion is preferably of low concentration such as below 50% and preferably below 20% and lower to keep impregnation below the preferred maximum.

What is claimed is:
1. A surgical suture of improved knotting characteristics consisting essentially of a multifilament polyester thread, said polyester being a condensation polymeric reaction product of a dicarboxylic acid and a diol, and polytetrafluoroethylene, said polytetrafluoroethylene being deposited in the interstices of the said thread to improve knotting characteristics of the suture by reducing the tendency of the knot not throw to open.

2. A surgical suture of improved knotting characteristics consisting essentially of a multifilament polyethylene terephthalate thread and polytetrafluoroethylene, said polytetrafluoroethylene being deposited in the interstices of the said thread to improve knotting characteristics of the suture by reducing the tendency of the knot throw to open.

3. A surgical suture of improved knotting characteristics consisting essentially of a multifilament polyester thread, said polyester being a condensation polymeric reaction product of a dicarboxylic acid and a diol, and polytetrafluoroethylene, said polytetrafluoroethylene being deposited on the external surface of the thread to improve the knotting characteristics of the suture by enhancing the ability of the suture to snug down.

4. A surgical suture of improved knotting characteristics consisting essentially of a multifilament polyethylene terephthalate thread and polytetrafluoroethylene, said polytetrafluoroethylene being deposited on the external surface of the thread to improve the knotting characteristics of the suture by enhancing the ability of the suture to snug down.

5. A surgical suture as claimed in claim 4 wherein the said deposition of polytetrafluoroethylene on the external surface of the thread is intermittent.

6. A surgical suture of improved knotting characteristics consisting essentially of a multifilament polyester thread, said polyester being a condensation polymeric reaction product of a dicarboxylic acid and a diol, and polytetrafluoroethylene, said polytetrafluoroethylene being deposited in the interstices of the thread and on the external surface of the thread to improve the knotting characteristics of the suture by reducing the tendency of the knot throw to open and by enhancing the ability of the suture to snug down.

7. A surgical suture of improved knotting characteristics consisting essentially of a multifilament polyethylene terephthalate thread and polytetrafluoroethylene, said polytetrafluoroethylene being deposited in the interstices of the thread and on the external surface of the thread to improve the knotting characteristics of the suture by reducing the tendency of the knot throw to open and by enhancing the ability of the suture to snug down.

8. A surgical suture as claimed in claim 7 wherein the said deposition of polytetrafluoroethylene on the external surface of the thread is intermittent.

References Cited
UNITED STATES PATENTS

| 2,193,188 | 3/1940  | Bradley    | 128—335.5 |
|-----------|---------|------------|-----------|
| 2,870,045 | 1/1959  | Corkum     | 117—138.8 |
| 2,909,177 | 10/1959 | Dowd et al.| 128—335.5 |
| 3,187,752 | 6/1965  | Glick      | 128—335.5 |
| 3,307,971 | 3/1967  | Kurtz      | 117—138.8 |
| 3,322,125 | 5/1967  | Kurtz      | 128—335.5 |

OTHER REFERENCES

Postlethwait et al.: "Wound Healing," Surgery, Gyne., & Obstet. May 1959, pp. 555–566.

Postlethwait et al.: "Experimental Study of Polyester Fiber Suture," Amer. Jour. of Surg., vol. 102, November 1961, pp. 706–709.

DALTON L. TRULUCK, *Primary Examiner.*

Disclaimer and Dedication 3,390,681.—*Leonard D. Kurtz*, Woodmere, N.Y. POLYESTER SUTURE HAVING IMPROVED KNOTTING CHARACTERISTICS. Patent dated July 2, 1968. Disclaimer and dedication filed Apr. 22, 1968, by the assignee, *Sutures Inc.*

Hereby disclaims and dedicates to the Public the terminal portion of the term of the patent subsequent to May 13, 1984.

[*Official Gazette October 8, 1968.*]